(12) United States Patent
Zhu et al.

(10) Patent No.: US 11,713,057 B2
(45) Date of Patent: Aug. 1, 2023

(54) FEEDBACK BASED REAL TIME STEERING CALIBRATION SYSTEM

(71) Applicants: Baidu USA LLC, Sunnyvale, CA (US); Baidu.com Times Technology (Beijing) Co., Ltd., Beijing (CN)

(72) Inventors: Fan Zhu, Sunnyvale, CA (US); Bei Liu, Sunnyvale, CA (US); Xin Xu, Sunnyvale, CA (US); Lin Ma, Sunnyvale, CA (US)

(73) Assignees: BAIDU USA LLC, Sunnyvale, CA (US); BAIDU.COM TIMES TECHNOLOGY (BEIJING) CO., LTD., Beijing (CN)

( * ) Notice: Subject to any disclaimer, the term of this patent is extended or adjusted under 35 U.S.C. 154(b) by 415 days.

(21) Appl. No.: 16/646,958

(22) PCT Filed: Jan. 23, 2020

(86) PCT No.: PCT/CN2020/073969
§ 371 (c)(1),
(2) Date: Mar. 12, 2020

(87) PCT Pub. No.: WO2021/147070
PCT Pub. Date: Jul. 29, 2021

(65) Prior Publication Data
US 2021/0229704 A1 Jul. 29, 2021

(51) Int. Cl.
*B60W 60/00* (2020.01)
*B60W 50/10* (2012.01)
(Continued)

(52) U.S. Cl.
CPC ........ *B60W 60/0018* (2020.02); *B60W 10/20* (2013.01); *B60W 50/06* (2013.01);
(Continued)

(58) Field of Classification Search
None
See application file for complete search history.

(56) References Cited

U.S. PATENT DOCUMENTS

| 2003/0236606 | A1* | 12/2003 | Lu | B60G 17/0195 701/1 |
| 2012/0041658 | A1* | 2/2012 | Turner | B62D 15/0245 701/1 |

(Continued)

FOREIGN PATENT DOCUMENTS

| CN | 109795477 A | * | 5/2019 | ........... B62D 15/025 |
| WO | WO-2021063787 A1 | * | 4/2021 | ........... B60W 40/114 |

*Primary Examiner* — Christian Chace
*Assistant Examiner* — Shayne M. Gilbertson
(74) *Attorney, Agent, or Firm* — Womble Bond Dickinson (US) LLP

(57) ABSTRACT

A lateral control error of a steering system of an ADV is determined, which includes iteratively performing following operations for a predetermined time period. Whether the ADV is moving within a predetermined proximity of a current moving direction is determined. Next, whether a road condition of a road on which the ADV is driving satisfies a predetermined road condition is determined. Then, a first steering feedback of the ADV in response to a prior steering control command is measured. Thereafter, the lateral control error is determined based on at least a portion of the first steering feedback over the predetermined time period. Further, a steering command in view of the lateral control error of the steering system is generated. Finally, the steering command is applied to control the ADV to compensate the lateral control error of the steering system.

20 Claims, 9 Drawing Sheets

(51) Int. Cl.
*B60W 50/06* (2006.01)
*B60W 10/20* (2006.01)

(52) U.S. Cl.
CPC ......... *B60W 50/10* (2013.01); *B60W 2520/06* (2013.01); *B60W 2520/10* (2013.01); *B60W 2552/15* (2020.02); *B60W 2554/4049* (2020.02); *B60W 2555/20* (2020.02)

(56) References Cited

U.S. PATENT DOCUMENTS

2015/0298691 A1* 10/2015 Kodaira ................ B60W 30/10
  701/48
2016/0152237 A1* 6/2016 Takahashi ................ B62D 6/00
  701/41
2017/0088176 A1* 3/2017 Tamura ................ B62D 15/025

* cited by examiner

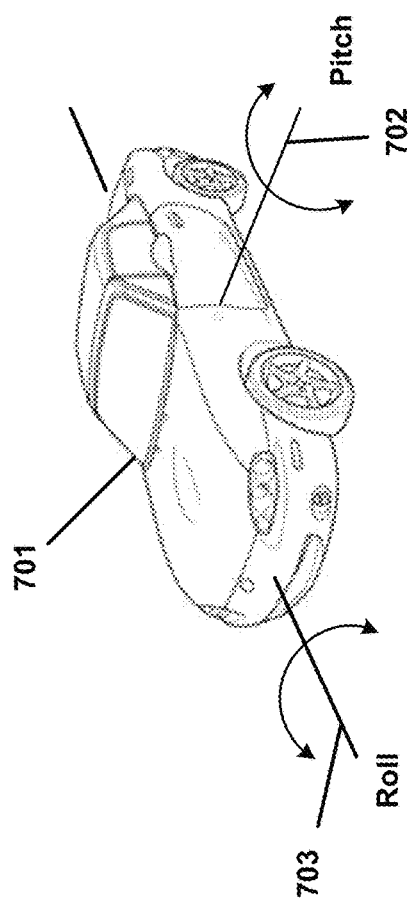
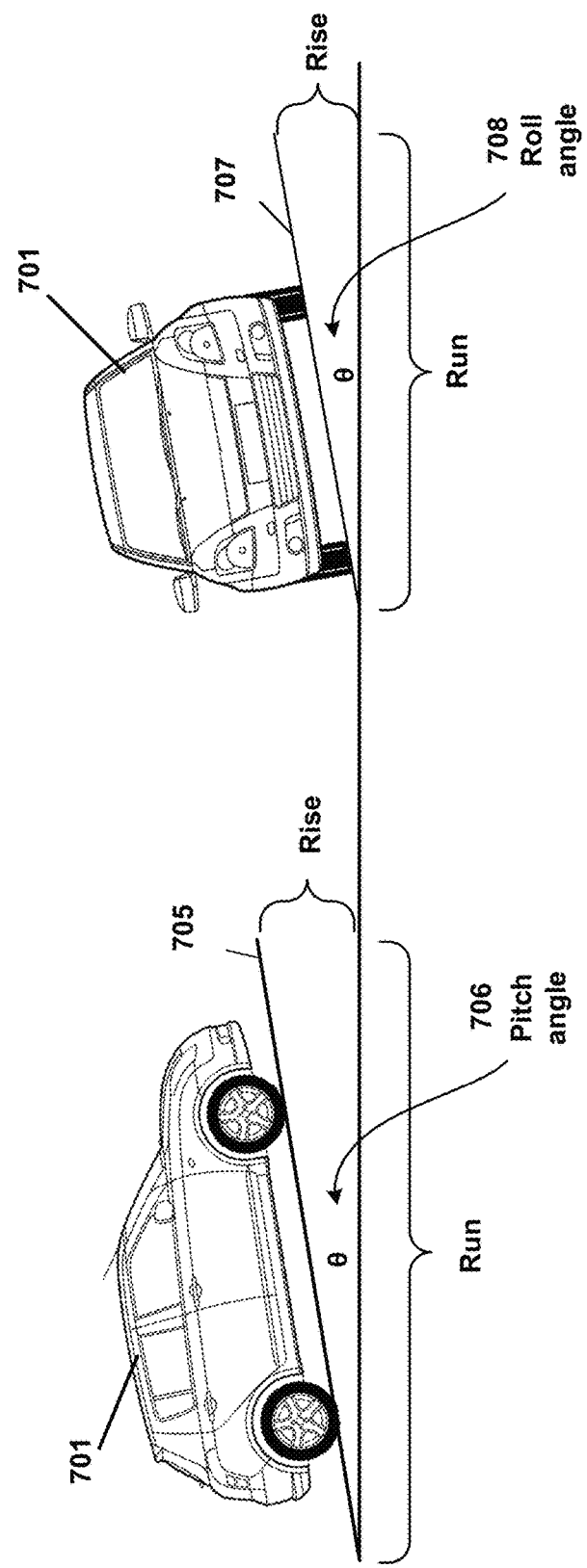
FIG. 7A
FIG. 7B
FIG. 7C

FEEDBACK BASED REAL TIME STEERING CALIBRATION SYSTEM

CROSS-REFERENCE TO RELATED APPLICATION

This patent application is a U.S. National Phase Application under 35 U.S.C. § 371 of International Application No. PCT/CN2020/073969, filed Jan. 23, 2020 entitled "A FEEDBACK BASED REAL TIME STEERING CALIBRATION SYSTEM," which is incorporated by reference herein by its entirety.

TECHNICAL FIELD

Embodiments of the present disclosure relate generally to operating autonomous vehicles. More particularly, embodiments of the disclosure relate to a steering calibration system of an autonomous driving vehicle (ADV).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. A performance of an ADV may depend on motion control operations. However, conventional motion control operations do not provide a feedback based real time calibration of a steering system of an ADV. But the steering system of the ADV may not always be centered, which may lead to a lateral control error of the steering system of the ADV. The performance of the ADV may be degraded if the lateral control error of the steering system is not compensated. There may be a need to develop a feedback based real time steering calibration system to improve the performance of an ADV.

DISCLOSURE

Embodiments of the present disclosure provide a method for operating an autonomous driving vehicle (ADV), a non-transitory machine-readable medium and a data processing system.

Embodiments of a first aspect provide a method for operating an autonomous driving vehicle. The method comprises: determining a lateral control error of a steering system of the ADV, generating a steering command in view of the lateral control error of the steering system; and applying the steering command to control the ADV to compensate the lateral control error of the steering system. Determining a lateral control error of a steering system of the ADV includes iteratively performing following operations for a predetermined time period, perceiving a driving condition based on sensor data obtained from a plurality of sensors mounted on the ADV, determining whether the ADV is moving within a predetermined proximity of a current moving direction, determining whether a road condition of a road on which the ADV is driving satisfies a predetermined road condition based on the driving condition, measuring a first steering feedback of the ADV in response to a prior steering control command, and determining the lateral control error based on at least a portion of the first steering feedback over the predetermined time period, in response to determining that the ADV is moving within the predetermined proximity of the current moving direction and determining that the road condition satisfies the predetermined road condition over the predetermined time period.

In an embodiment, the determining whether the ADV is moving within the predetermined proximity of the current moving direction is based on whether a heading direction difference between a first heading direction of the ADV at a first time instant and a second heading direction of the ADV at a second time instant is less than a predetermined threshold.

In an embodiment, the determining whether the ADV is moving within the predetermined proximity of the current moving direction is based on whether a curvature of a trajectory of the ADV is less than a predetermined threshold curvature.

In an embodiment, the determining whether the road condition satisfies the predetermined road condition is based on whether at least one of a roll angle difference or a pitch angle difference between a first roll angle or a first pitch angle at a first time instant and a second roll angle or a second pitch angle at a second time instant is less than a predetermined threshold angle.

In an embodiment, the method further comprises determining whether the first steering feedback is stable.

In an embodiment, the determining whether the first steering feedback is stable is based on whether the first steering feedback at a first time instant and a second steering feedback at a second time instant is less than a predetermined threshold, and wherein the lateral control error is determined further in response to determining that the first steering feedback is stable.

In an embodiment, the method further comprises determining whether a speed of the ADV is larger than a predetermined threshold.

In an embodiment, the lateral control error is determined further in response to determining that the speed of the ADV is larger than the predetermined threshold over the predetermined time period.

Embodiments of a second aspect provide a non-transitory machine-readable medium. The non-transitory machine-readable medium has instructions stored therein, which when executed by a processor, cause the processor to perform operations, the operations comprising: determining a lateral control error of a steering system of the ADV, including iteratively performing following operations for a predetermined time period, perceiving a driving condition based on sensor data obtained from a plurality of sensors mounted on the ADV, determining whether the ADV is moving within a predetermined proximity of a current moving direction, determining whether a road condition of a road on which the ADV is driving satisfies a predetermined road condition based on the driving condition, measuring a first steering feedback of the ADV in response to a prior steering control command, and determining the lateral control error based on at least a portion of the first steering feedback over the predetermined time period, in response to determining that the ADV is moving within the predetermined proximity of the current moving direction and determining that the road condition satisfies the predetermined road condition over the predetermined time period; generating a steering command in view of the lateral control error of the steering system; and applying the steering command to control the ADV to compensate the lateral control error of the steering system.

In an embodiment, the determining whether the ADV is moving within the predetermined proximity of the current moving direction is based on whether a heading direction difference between a first heading direction of the ADV at a first time instant and a second heading direction of the ADV at a second time instant is less than a predetermined threshold.

In an embodiment, the determining whether the ADV is moving within the predetermined proximity of the current moving direction is based on whether a curvature of a trajectory of the ADV is less than a predetermined threshold curvature.

In an embodiment, the determining whether the road condition satisfies the predetermined road condition is based on whether at least one of a roll angle difference or a pitch angle difference between a first roll angle or a first pitch angle at a first time instant and a second roll angle or a second pitch angle at a second time instant is less than a predetermined threshold angle.

In an embodiment, the following operations further comprise determining whether the first steering feedback is stable.

In an embodiment, the determining whether the first steering feedback is stable is based on whether the first steering feedback at a first time instant and a second steering feedback at a second time instant is less than a predetermined threshold, and wherein the lateral control error is determined further in response to determining that the first steering feedback is stable.

In an embodiment, the following operations further comprise determining whether a speed of the ADV is larger than a predetermined threshold.

In an embodiment, the lateral control error is determined further in response to determining that the speed of the ADV is larger than the predetermined threshold over the predetermined time period.

Embodiments of a third aspect provide a data processing system, comprising: a processor; and a memory coupled to the processor to store instructions, which when executed by the processor, cause the processor to perform operations, the operations including determining a lateral control error of a steering system of the ADV, including iteratively performing following operations for a predetermined time period, perceiving a driving condition based on sensor data obtained from a plurality of sensors mounted on the ADV, determining whether the ADV is moving within a predetermined proximity of a current moving direction, determining whether a road condition of a road on which the ADV is driving satisfies a predetermined road condition based on the driving condition, measuring a first steering feedback of the ADV in response to a prior steering control command, and determining the lateral control error based on at least a portion of the first steering feedback over the predetermined time period, in response to determining that the ADV is moving within the predetermined proximity of the current moving direction and determining that the road condition satisfies the predetermined road condition over the predetermined time period; generating a steering command in view of the lateral control error of the steering system; and applying the steering command to control the ADV to compensate the lateral control error of the steering system.

In an embodiment, the determining whether the ADV is moving within the predetermined proximity of the current moving direction is based on whether a heading direction difference between a first heading direction of the ADV at a first time instant and a second heading direction of the ADV at a second time instant is less than a predetermined threshold.

In an embodiment, the determining whether the ADV is moving within the predetermined proximity of the current moving direction is based on whether a curvature of a trajectory of the ADV is less than a predetermined threshold curvature.

In an embodiment, the determining whether the road condition satisfies the predetermined road condition is based on whether at least one of a roll angle difference or a pitch angle difference between a first roll angle or a first pitch angle at a first time instant and a second roll angle or a second pitch angle at a second time instant is less than a predetermined threshold angle.

BRIEF DESCRIPTION OF THE DRAWINGS

Embodiments of the disclosure are illustrated by way of example and not limitation in the figures of the accompanying drawings in which like references indicate similar elements.

FIGS. 7A-7C illustrate an example of an operation according to one embodiment.

DETAILED DESCRIPTION

Figure 1:
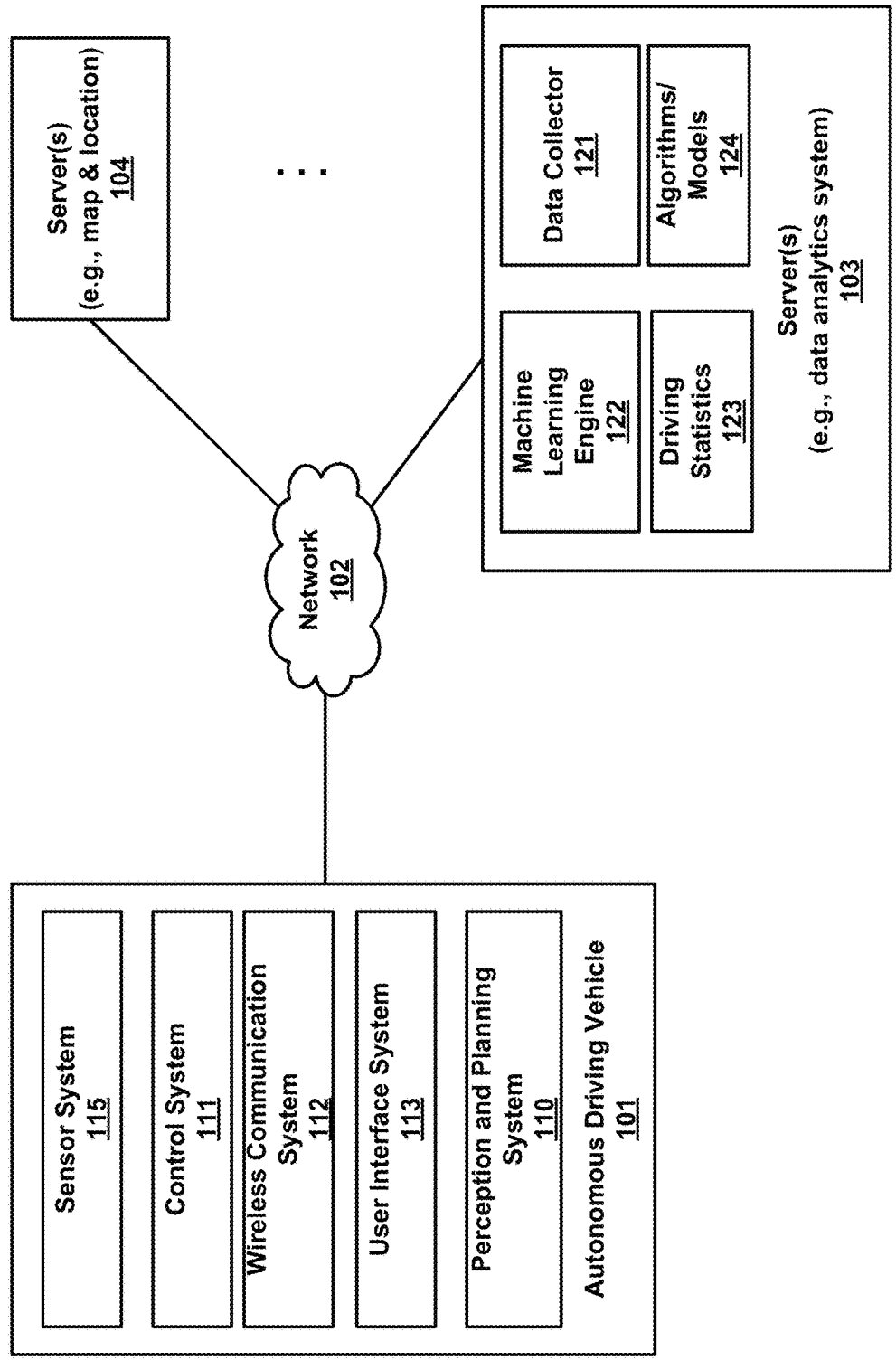
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, for a predetermined time period, an ADV is configured to determine the following conditions: (1) whether the ADV is currently driving along a straight line; (2) whether a road condition is flat; (3)

whether a steering feedback in response to a prior steering control command is stable; and (4) whether the ADV has a certain speed. In one embodiment, if the above four conditions are met for the predetermined time period, a lateral control error is determined based on the steering feedback over the predetermined time period. In one embodiment, the lateral control error is determined based on the steering feedback over the predetermined time period if one or more of the above four conditions are met for the predetermined time period. Next, a new steering command to compensate the lateral control error is generated. Finally, the new steering command is sent to control the ADV to compensate the lateral control error of the steering system to drive straight forward.

According to one embodiment, a lateral control error of a steering system of an ADV is determined, which includes iteratively performing following operations for a predetermined time period. A driving condition is perceived based on sensor data obtained from a plurality of sensors mounted on the ADV. Whether the ADV is moving within a predetermined proximity of a current moving direction is determined. Next, whether a road condition of a road on which the ADV is driving satisfies a predetermined road condition is determined based on the driving condition. Then, a first steering feedback of the ADV in response to a prior steering control command is measured. Thereafter, the lateral control error is determined based on at least a portion of the first steering feedback over the predetermined time period, in response to determining that the ADV is moving within the predetermined proximity of the current moving direction and determining that the road condition satisfies the predetermined road condition over the predetermined time period. Further, a steering command in view of the lateral control error of the steering system is generated. Finally, the steering command is applied to control the ADV to compensate the lateral control error of the steering system.

In one embodiment, whether the ADV is moving within the predetermined proximity of the current moving direction is determined based on whether a heading direction difference between a first heading direction of the ADV at a first time instant and a second heading direction of the ADV at a second time instant is less than a predetermined threshold. In one embodiment, whether the ADV is moving within the predetermined proximity of the current moving direction is determined based on whether a curvature of a trajectory of the ADV is less than a predetermined threshold curvature.

In one embodiment, whether the road condition satisfies the predetermined road condition is determined based on whether at least one of a roll angle difference or a pitch angle difference between a first roll angle or a first pitch angle of the ADV at a first time instant and a second roll angle or a second pitch angle of the ADV at a second time instant is less than a predetermined threshold angle.

In one embodiment, whether the first steering feedback is stable is determined. In one embodiment, the determining whether the first steering feedback is stable is based on whether the first steering feedback at a first time instant and a second steering feedback at a second time instant is less than a predetermined threshold, and the lateral control error is determined further in response to determining that the first steering feedback is stable.

In one embodiment, whether a speed of the ADV is larger than a predetermined threshold is determined. The lateral control error is determined further in response to determining that the speed of the ADV is larger than the predetermined threshold over the predetermined time period. In one embodiment, the steering command is generated based on deducting the lateral control error of the steering system.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
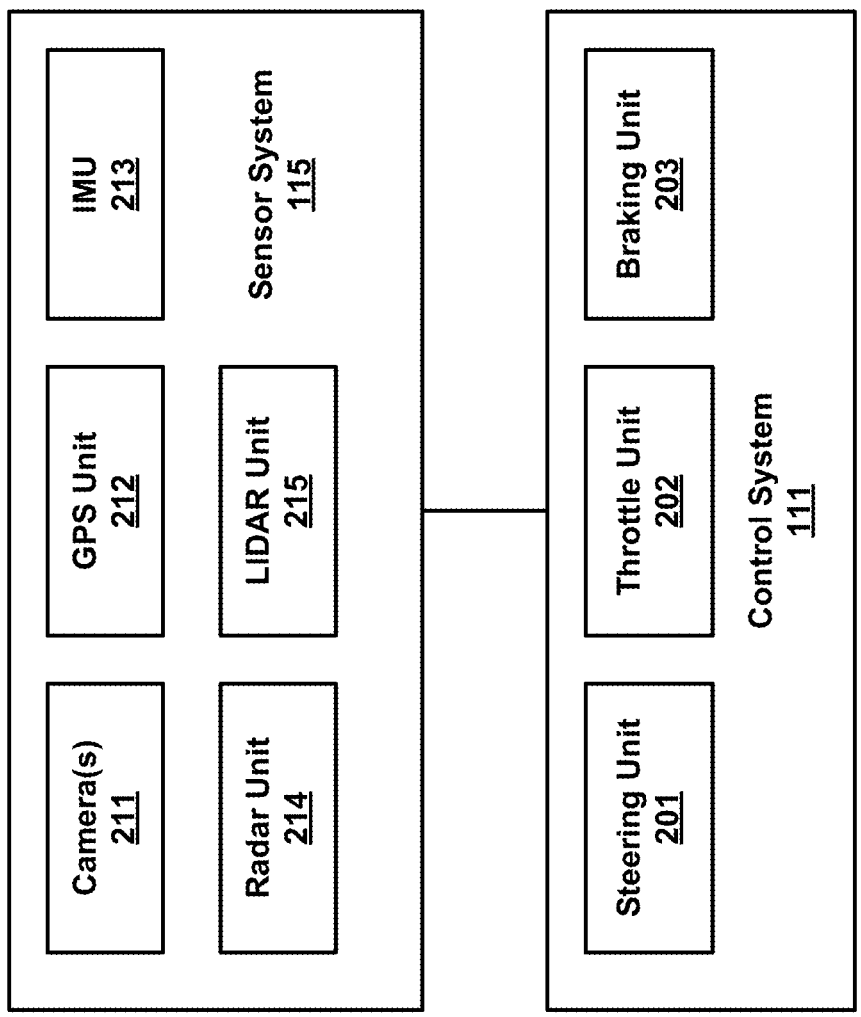
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include an algorithm or model to determine a lateral control error of a steering system of the ADV, which includes algorithms or models to iteratively perform following operations for a predetermined time period, where the algorithms or models include an algorithm or model to perceive a driving condition based on sensor data obtained from a plurality of sensors mounted on the ADV, an algorithm or model to determine whether the ADV is moving within a predetermined proximity of a current moving direction, an algorithm or model to determine whether a road condition of a road on which the ADV is driving satisfies a predetermined road condition, an algorithm or model to measure a first steering feedback of the ADV in response to a prior steering control command, and an algorithm or model to determine the lateral control error based on at least a portion of the first steering feedback over the predetermined time period. The algorithms 124 may further include an algorithm or model to generating a steering command in view of the lateral control error of the steering system and an algorithm or model to apply the steering command to control the ADV to compensate the lateral control error of the steering system. Algorithms 124 can then be uploaded on ADVs to be utilized during autonomous driving in real-time.

Figure 3A:
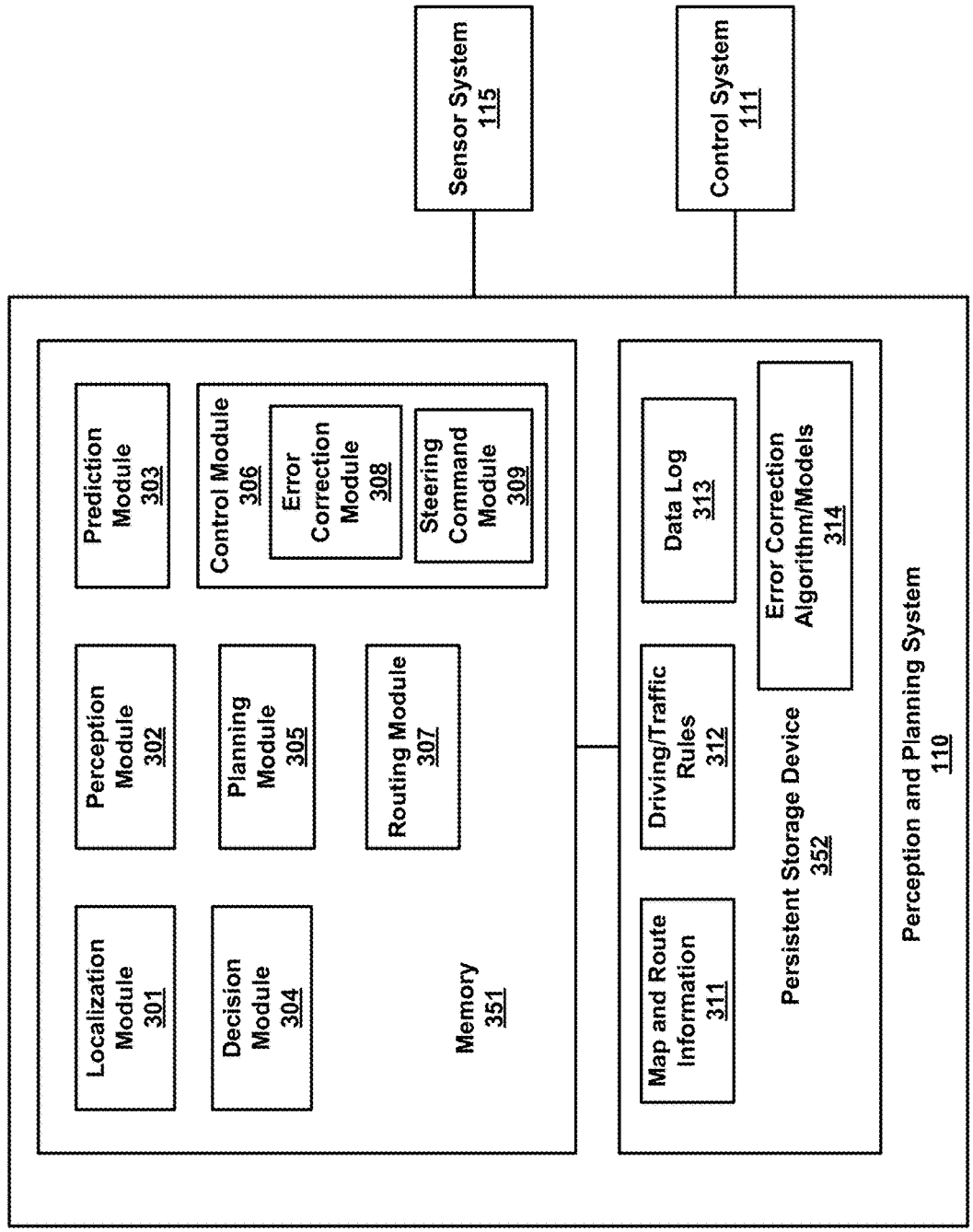
FIGS. 3A-3B are block diagrams illustrating an example of a perception and planning system used with an autonomous vehicle according to one embodiment.
Figure 3B:
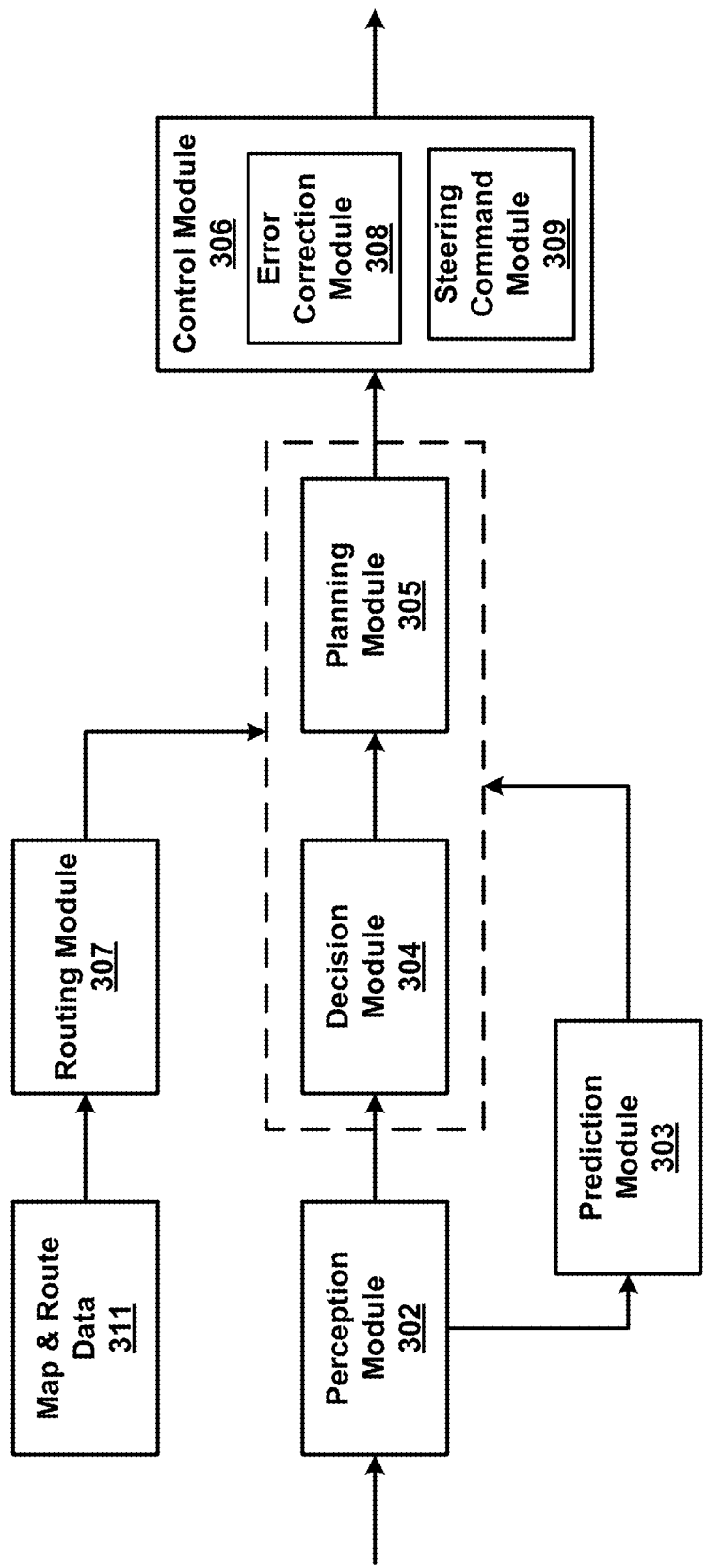

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, error correction module 308 and steering command module 309.

Some or all of modules 301-309 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-309 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Although not shown, perception and planning system 110 further includes a data logger or data collector configured to collect data processed by the components 301-309 and sensors over a period of time, which may be stored as a part of data log 313. For example, data log 313 includes any prediction, decision, and paths planned or made in each of the driving/planning cycle. Data log 313 may further include control commands issued and the responses or states (e.g., speed, acceleration, heading, locations, etc.) of the vehicle captured at different points in time during each driving cycle. Data log 313 may further include the obstacles or moving objects perceived over a period of time and their behaviors (e.g., prior locations, speed, headings captured during past cycles, etc.). Data log 313 may be utilized for planning and controlling the vehicle subsequently or alternatively, data log 313 may be analyzed offline for improving the driving algorithms or predictive models. Perception and planning system 110 further includes error correction algorithm/models 314 which stores control error correction algorithm/models.

According to one embodiment, error correction module 308 is configured to determine a lateral control error of a steering system of the ADV. The error correction module 308 works together with error correction algorithm/models 314 to correct the lateral control error of the steering system of the ADV. Steering command module 309 is configured to generate a steering command in view of the lateral control error of the steering system and apply the steering command to control the ADV to compensate the lateral control error of the steering system.

Figure 4:
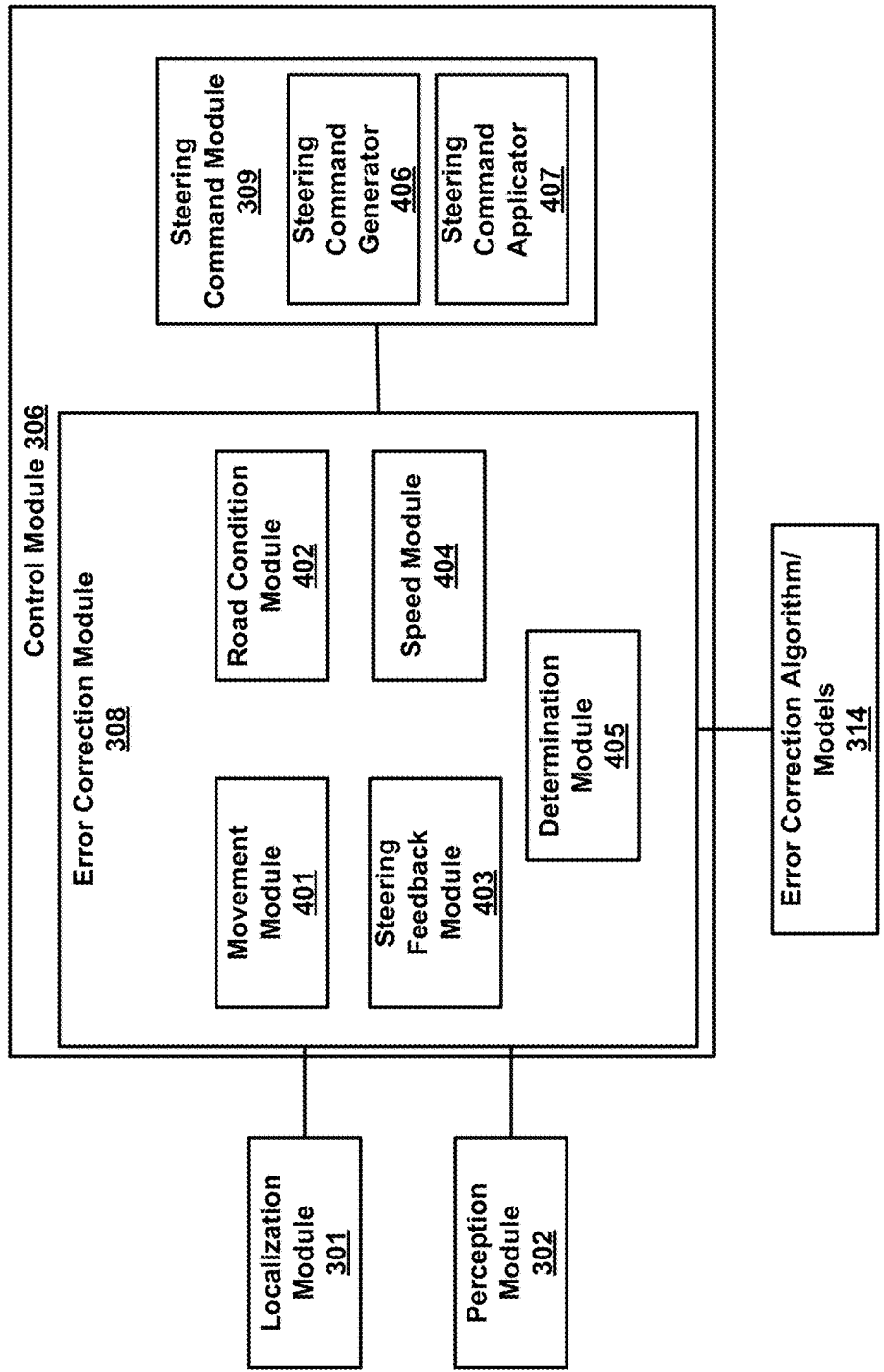
FIG. 4 is a block diagram illustrating an example of an error correction module and a steering command module according to one embodiment.

FIG. 4 is a block diagram 400 illustrating an example of error correction module 308 and steering command module 309 according to one embodiment. Error correction module 308 includes, but is not limited to, movement module 401, road condition module 402, steering feedback module 403, speed module 404 and determination module 405, which work together using error correction algorithm/models 314 to determine a lateral control error of a steering system of the ADV. Note that modules 401-405 may be integrated into fewer number of modules or a single module. Steering command module 309 includes, but is not limited to, steering command generator 406 to generate a steering command in view of the lateral control error of the steering system, and steering command applicator to apply the steering command to control the ADV to compensate the lateral control error of the steering system.

According to one embodiment, a lateral control error of a steering system of an ADV is determined by error correction module 308. Error correction module 308 may iteratively perform following operations for a predetermined time period. Whether the ADV is moving within a predetermined proximity of a current moving direction is determined by movement module 401. Whether a road condition of a road on which the ADV is driving satisfies a predetermined road condition is determined by road condition module 402. A first steering feedback of the ADV in response to a prior steering control command is measured by steering feedback module 403. The lateral control error is determined based on at least a portion of the first steering feedback over the predetermined time period by determination module 405. Further, a steering command in view of the lateral control error of the steering system is generated by steering command generator 406. Finally, the steering command is applied by steering command applicator 407 to control the ADV to compensate the lateral control error of the steering system.

Motion control is an important component of an ADV. A performance of the ADV may depend on motion control operations. However, conventional motion control operations do not provide a feedback based real time calibration of a steering system of an ADV. But the steering system of the ADV may not always be centered, which may lead to a lateral control error of the steering system of the ADV. The performance of the ADV may be degraded if the lateral control error of the steering system is not compensated. There may be a need to develop a feedback based real time steering calibration system to improve the performance of the ADV.

Figure 5:
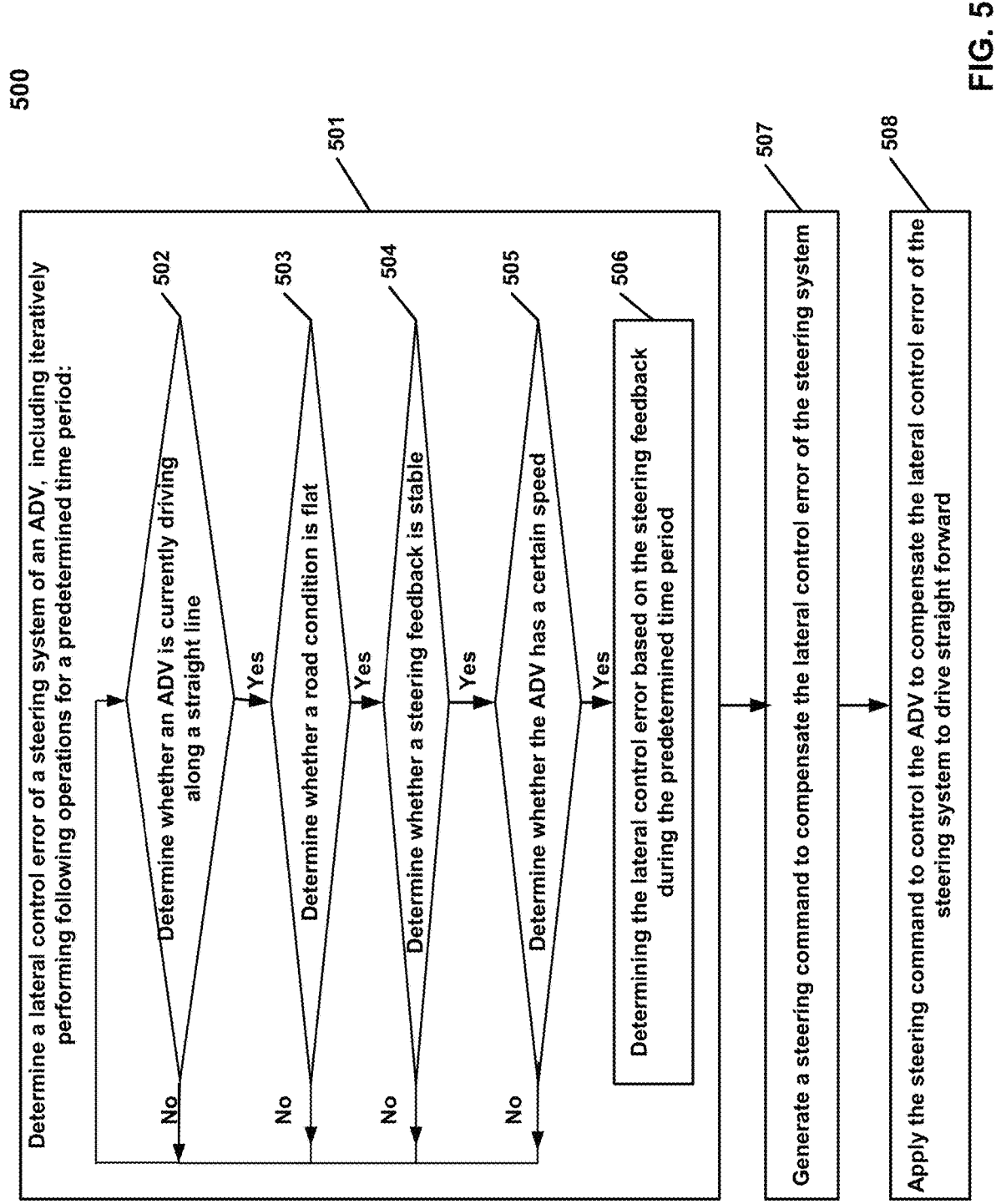
FIG. 5 is a processing flow diagram illustrating an example of a method to provide a feedback based real time steering calibration system according to one embodiment.

FIG. 5 is a processing flow diagram 500 illustrating an example of a method to provide a feedback based real time steering calibration system of an ADV according to one embodiment. Disclosed herein is a feedback based real time steering calibration method and system to compensate a lateral control error of a steering system of an ADV. In this method, the lateral control error is determined based on a steering feedback over a predetermined time period. A steering command to compensate the lateral control error is generated and applied to control the ADV to compensate the lateral control error of the steering system. By this method, the ADV may compensate the lateral control error of the steering system and drive in a straight line forward, thereby improving the performance of the ADV.

At operation 501, the ADV is configured to determine the lateral control error of the steering system. In one embodiment, the ADV may be configured to iteratively perform certain operations for a predetermined time period in order to determine the lateral control error of the steering system. For example, the ADV may be configured to determine the following conditions: (1) whether the ADV is currently driving along a straight line; (2) whether a road condition is flat; (3) whether a steering feedback in response to a prior steering control command is stable; and (4) whether the ADV has a certain speed.

At operation 502, the ADV may be configured to determine whether the ADV is currently driving along a straight line. In one embodiment, the ADV may be configured to determine whether the ADV is moving within a predetermined proximity of a current moving direction. In one embodiment, whether the ADV is currently driving along a straight line or moving within a predetermined proximity of a current moving direction may be performed by movement module 401 based on information from localization module 301.

Figure 6:
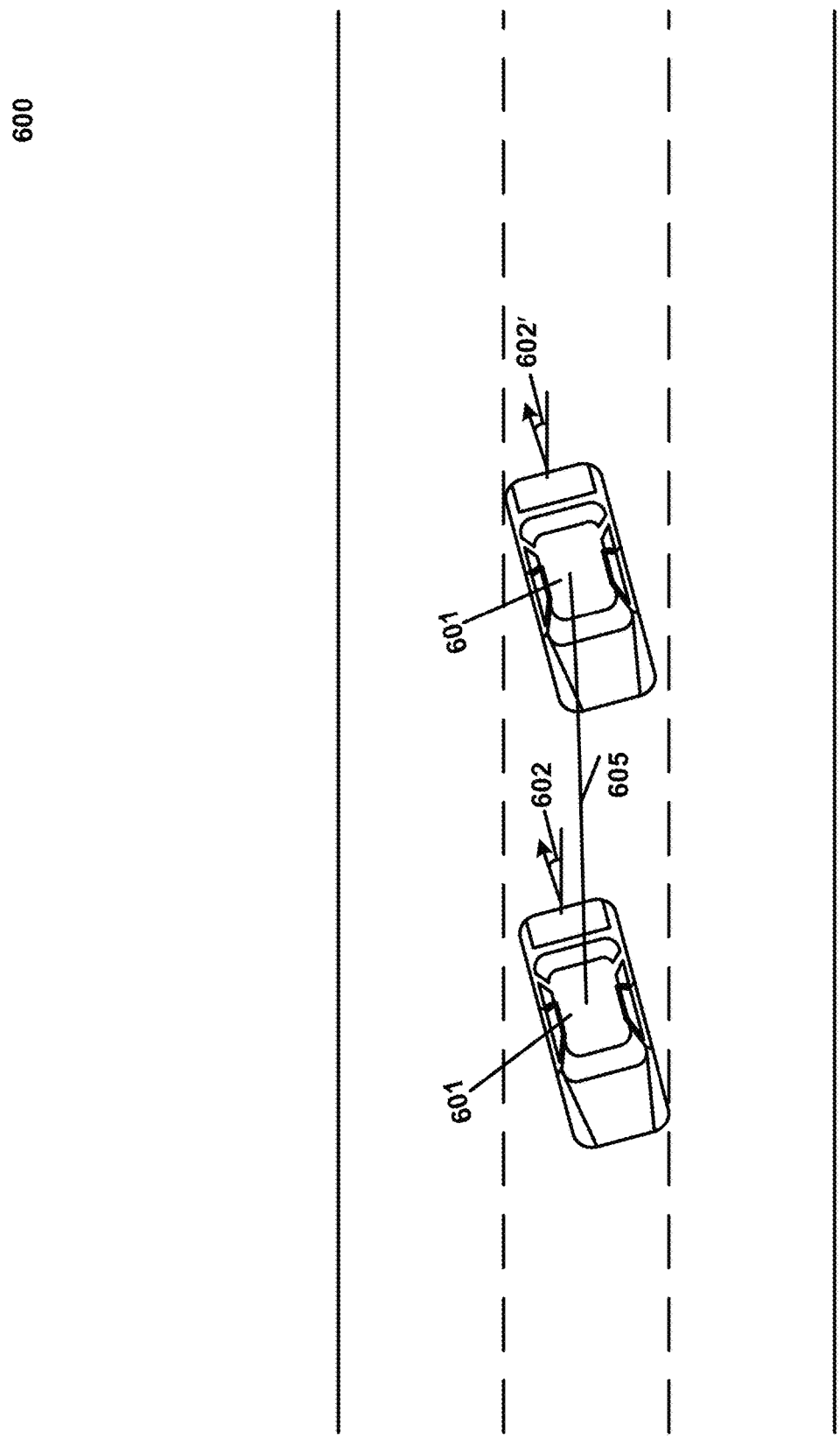
FIG. 6 illustrates an example of an operation according to one embodiment.

FIG. 6 illustrates an example of the operation 502 to determine whether the ADV is currently driving along a straight line. As illustrated in FIG. 6, ADV 601 is driving with a first heading direction 602 at a first time instant and a second heading direction 602' at a second time instant. The ADV 601 has a trajectory 605. However, it is not possible for an ADV to drive along an absolute straight line.

Referring to FIG. 5 and FIG. 6, in one embodiment, a straight line may be determined as a heading direction difference between the first heading direction 602 at the first time instant and the second heading direction 602' at the second time instant is smaller than a predetermined threshold. For example, the predetermined threshold may be 1 degree. For another example, the predetermined threshold may be 1, 2, 5, 10 degrees or any values therebetween.

In one embodiment, a straight line may be determined based on whether the ADV is moving with a curvature of a trajectory 605 less than a predetermined threshold. For example, the predetermined threshold may be 0.01 (1/m). For another example, the predetermined threshold may be 0.01, 0.02, 0.05, 1 (1/m) or any values therebetween.

In one embodiment, whether the ADV 601 is currently driving along a straight line is based on whether the ADV 601 is moving within a predetermined proximity of a current moving direction 602. Whether the ADV 601 is moving within the predetermined proximity of the current moving direction 602 is based on whether a heading direction difference between a first heading direction 602 of the ADV 601 at a first time and a second heading direction 602' of the ADV 601 at a second time is less than a predetermined threshold. In one embodiment, whether the ADV 601 is moving within the predetermined proximity of the current moving direction 602 is based on whether a curvature of a trajectory 605 of the ADV is less than a predetermined threshold curvature.

At operation 503, the ADV may be configured to determine whether a road condition is flat. Road condition module 402 may determine whether a road condition is flat.

FIGS. 7A-7C illustrate an example of the operation 503 to determine whether a road condition on which an ADV 701 is driving is flat. As illustrated in FIG. 7A, the ADV 701 has two axes, a side-to-side axis 702 and a front-to-back axis 703. Rotation around the side-to-side axis 702 is referred as pitch. Rotation around the front-to-back axis 703 is referred as roll. When the ADV 701 is driving on a road 705 which is rising along a moving direction, the ADV 701 rotates around the side-to-side axis 702 with a pitch angle 706, as illustrated in FIG. 7B. When the ADV 701 is driving on a road 707 which is rising perpendicular to a moving direction, the ADV 701 rotates around the front-to-back axis 703 with a roll angle 708, as illustrated in FIG. 7C.

Referring to FIG. 5 and FIG. 7, in one embodiment, the ADV (e.g., 701) is configured to determine whether the road (e.g., 705) is flat based on whether a pitch angle difference between a first pitch angle at a first time instant and a second pitch angle at a second time instant is less than a predetermined threshold pitch angle. For example, the predetermined threshold pitch angle may be 1 degree. For another example, the predetermined threshold pitch angle may be 1, 2, 5, 10 degrees or any values therebetween. In one embodiment, the ADV (e.g., 701) is configured to determine whether the road (e.g., 707) is flat based on whether a roll angle difference between a first roll angle at a first time instant and a second roll angle at a second time instant is less than a predetermined threshold roll angle. For example, the predetermined threshold roll angle may be 1 degree. For another example, the predetermined threshold roll angle may be 1, 2, 5, 10 degrees or any values therebetween.

Referring back to FIG. 5, at operation 504, the ADV may be configured to determine whether a steering feedback is stable. Steering feedback module 403 may be configured to measure a first steering feedback of the ADV at a first time instant and a second steering feedback at a send time instant in response to a prior steering control command. In one embodiment, whether a first steering feedback is stable is determined based on whether the difference between the first steering feedback at the first time instant and the second steering feedback at the second time instant is less than a predetermined threshold. For example, the predetermined threshold may be 0.5 degree. For another example, the predetermined threshold may be 0.5, 1, 2, 3, 4, 5 degrees or any values therebetween. In one embodiment, if the difference between the first steering feedback at the first time instant and the second steering feedback at the second time instant is less than a predetermined threshold, the first steering feedback may be determined to be stable.

At operation 505, the ADV may be configured to determine whether the ADV has a speed larger than a predetermined threshold speed. For example, the predetermined threshold speed may be 1.0 m/s. As a stopped vehicle may meet the conditions in operations 502, 503 and 504.

At operation 506, the ADV may be configured to determine the lateral control error of the steering system. In one embodiment, if for a continuous predetermined time period, the above four conditions in operations 502, 503, 504 and 505 are met, the first steering feedback measured at operation 504 may be determined to be the lateral control error. For example, the predetermined time period may be 10 second. If one of the conditions in operations 502, 503, 504 and 505 is not met, the process may start over. Because the ADV is driving in a straight line on a flat road with the first steering feedback, the steering system is not centered and the first steering feedback is the lateral control error.

In one embodiment, the lateral control error is determined based on the steering feedback over the predetermined time period if one or more of the above four conditions are met for the predetermined time period. For example, the lateral control error may be determined based on the steering feedback over the predetermined time period if the ADV is moving within the predetermined proximity of the current moving direction and the road condition satisfies the predetermined road condition over the predetermined time period;

At operation 507, a new steering command to compensate the lateral control error is generated. In one embodiment, the new steering command may be generated by deducting the lateral control error. For example, to control the ADV, the prior steering control command may be CMD_steer. The first steering feedback that is stable may be Steer_new. Thus, the new steering command may be CMD_Steer-Steer_new, which is generated to compensate the lateral control error of the steering system.

Finally, at operation 508, the new steering command is sent to control the ADV to compensate the lateral control error in order to drive in a straight line forward.

Figure 8:
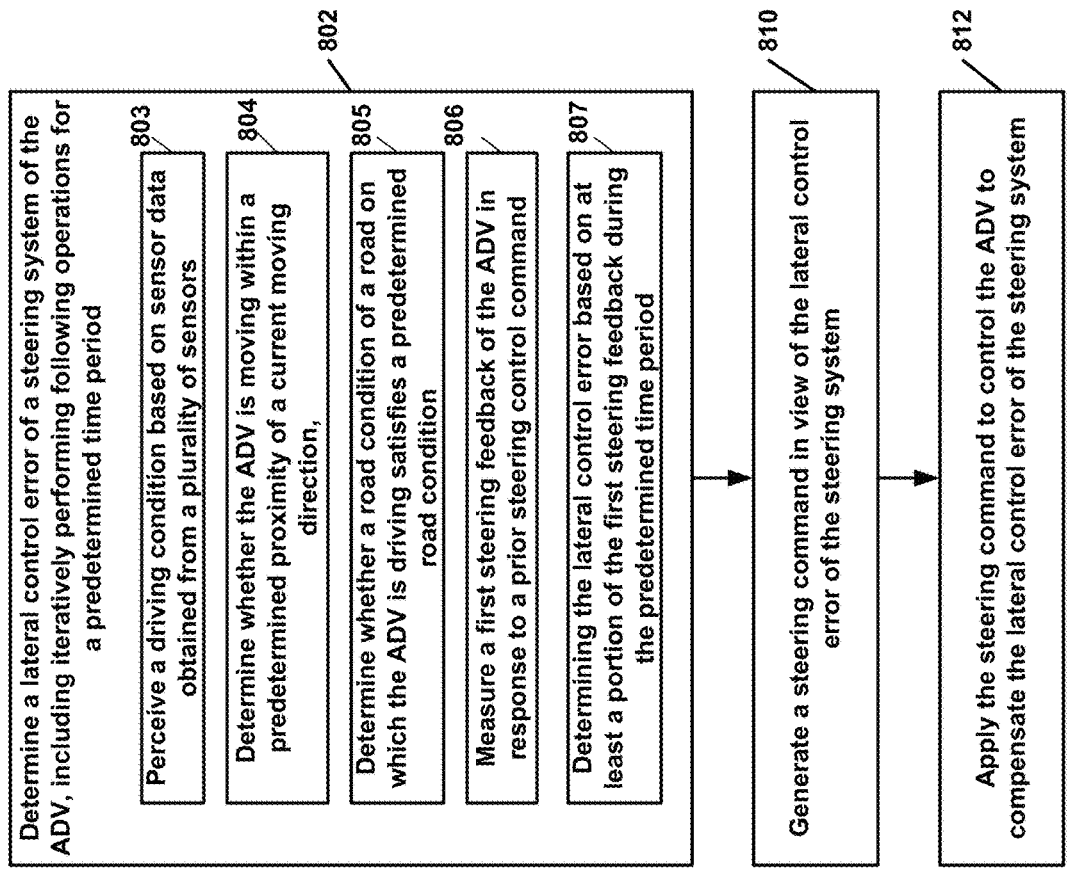
FIG. 8 is a flow diagram illustrating an example of a process for providing a feedback based real time steering calibration according to one embodiment.

FIG. 8 is a flow diagram illustrating an example of a process for providing a feedback based real time steering calibration according to one embodiment. Process 800 may be performed by processing logic which may include software, hardware, or a combination thereof. For example, process 800 may be performed by control module 306. Referring to FIG. 8, in operation 802, processing logic determines a lateral control error of a steering system of the ADV, including iteratively performing following operations for a predetermined time period. In operation 803, processing logic perceives a driving condition based on sensor data obtained from a plurality of sensors mounted on the ADV. In operation 804, processing logic determines whether the ADV is moving within a predetermined proximity of a current moving direction. In operation 805, processing logic determines whether a road condition of a road on which the ADV is driving satisfies a predetermined road condition based on the driving condition. In operation 806, processing logic measures a first steering feedback of the ADV in response to a prior steering control command. In operation 807, processing logic determines the lateral control error based on at least a portion of the first steering feedback over the predetermined time period, in response to determining that the ADV is moving within the predetermined proximity of the current moving direction and determining that the road condition satisfies the predetermined road condition over the predetermined time period. In operation 810, processing logic generates a steering command in view of the lateral control error of the steering system. In operation 812, processing logic applies the steering command to control the ADV to compensate the lateral control error of the steering system.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:
1. A computer-implemented method for operating an autonomous driving vehicle (ADV), the method comprising:
 determining a lateral control error of a steering system of the ADV, including iteratively performing following operations for a predetermined time period, perceiving a driving condition based on sensor data obtained from a plurality of sensors mounted on the ADV,
determining whether the ADV is moving along a straight line based on whether the ADV is moving with a curvature of a trajectory less than a predetermined threshold curvature,
determining whether a road condition of a road on which the ADV is driving satisfies a predetermined road condition based on the driving condition,
measuring a first steering feedback of the ADV in response to a prior steering control command,
determining whether the first steering feedback is stable based on whether the first steering feedback at a first time instant and a second steering feedback at a second time instant is less than a predetermined threshold, and
determining the lateral control error based on at least a portion of the first steering feedback over the predetermined time period, in response to determining that (1) the ADV is moving along the straight line, (2) determining the road condition satisfies the predetermined road condition over the predetermined time period, and (3) the first steering feedback being stable;
generating a steering command in view of the lateral control error of the steering system; and
applying the steering command to control the ADV to compensate the lateral control error of the steering system.

2. The method of claim 1, wherein the determining whether the ADV is moving along the straight line is further based on whether a heading direction difference between a first heading direction of the ADV at a first time instant and a second heading direction of the ADV at a second time instant is less than a predetermined threshold.

3. The method of claim 1, wherein the predetermined threshold curvature is 0.01 (1/m).

4. The method of claim 1, wherein the determining whether the road condition satisfies the predetermined road condition is based on whether at least one of a roll angle difference or a pitch angle difference between a first roll angle or a first pitch angle at a first time instant and a second roll angle or a second pitch angle at a second time instant is less than a predetermined threshold angle.

5. The method of claim 1, further comprising determining that the first steering feedback is stable.

6. The method of claim 5, wherein the lateral control error is determined further in response to determining that the first steering feedback is stable.

7. The method of claim 1, further comprising determining whether a speed of the ADV is larger than a predetermined threshold.

8. The method of claim 7, wherein the lateral control error is determined further in response to determining that the speed of the ADV is larger than the predetermined threshold over the predetermined time period.

9. A non-transitory machine-readable medium having instructions stored therein, which when executed by a processor, cause the processor to perform operations, the operations comprising:
determining a lateral control error of a steering system of the ADV, including iteratively performing following operations for a predetermined time period,
perceiving a driving condition based on sensor data obtained from a plurality of sensors mounted on the ADV,
determining whether the ADV is moving along a straight line based on whether the ADV is moving with a curvature of a trajectory less than a predetermined threshold curvature,
determining whether a road condition of a road on which the ADV is driving satisfies a predetermined road condition based on the driving condition,
measuring a first steering feedback of the ADV in response to a prior steering control command,
determining whether the first steering feedback is stable based on whether the first steering feedback at a first time instant and a second steering feedback at a second time instant is less than a predetermined threshold, and
determining the lateral control error based on at least a portion of the first steering feedback over the predetermined time period, in response to determining that (1) the ADV is moving along the straight line, (2) the road condition satisfies the predetermined road condition over the predetermined time period, and (3) the first steering feedback being stable;
generating a steering command in view of the lateral control error of the steering system; and
applying the steering command to control the ADV to compensate the lateral control error of the steering system.

10. The non-transitory machine-readable medium of claim 9, wherein the determining whether the ADV is moving along the straight line is further based on whether a heading direction difference between a first heading direction of the ADV at a first time instant and a second heading direction of the ADV at a second time instant is less than a predetermined threshold.

11. The non-transitory machine-readable medium of claim 9, wherein the predetermined threshold curvature threshold is 0.01 (1/m-).

12. The non-transitory machine-readable medium of claim 9, wherein the determining whether the road condition satisfies the predetermined road condition is based on whether at least one of a roll angle difference or a pitch angle difference between a first roll angle or a first pitch angle at a first time instant and a second roll angle or a second pitch angle at a second time instant is less than a predetermined threshold angle.

13. The non-transitory machine-readable medium of claim 9, wherein the following operations further comprise determining that the first steering feedback is stable.

14. The non-transitory machine-readable medium of claim 13, wherein the lateral control error is determined further in response to determining that the first steering feedback is stable.

15. The non-transitory machine-readable medium of claim 9, wherein the following operations further comprise determining whether a speed of the ADV is larger than a predetermined threshold.

16. The non-transitory machine-readable medium of claim 15, wherein the lateral control error is determined further in response to determining that the speed of the ADV is larger than the predetermined threshold over the predetermined time period.

17. A data processing system, comprising:
a processor; and
a memory coupled to the processor to store instructions, which when executed by the processor, cause the processor to perform operations, the operations including determining a lateral control error of a steering system of the ADV, including iteratively performing following operations for a predetermined time period, perceiving a driving condition based on sensor data obtained from a plurality of sensors mounted on the ADV, determining whether the ADV is moving along a straight line based on whether the ADV is moving with a curvature of a trajectory less than a predetermined threshold curvature, determining whether a road condition of a road on which the ADV is driving satisfies a predetermined road condition based on the driving condition, measuring a first steering feedback of the ADV in response to a prior steering control command, determining whether the first steering feedback is stable based on whether the first steering feedback at a first time instant and a second steering feedback at a second time instant is less than a predetermined threshold, and determining the lateral control error based on at least a portion of the first steering feedback over the predetermined time period, in response to determining that (1) the ADV is moving along the straight line, (2) the road condition satisfies the predetermined road condition over the predetermined time period, and (3) the first steering feedback being stable, generating a steering command in view of the lateral control error of the steering system; and applying the steering command to control the ADV to compensate the lateral control error of the steering system.

18. The data processing system of claim 17, wherein the determining whether the ADV is moving along the straight line is further based on whether a heading direction difference between a first heading direction of the ADV at a first time instant and a second heading direction of the ADV at a second time instant is less than a predetermined threshold.

19. The data processing system of claim 17, wherein the predetermined threshold curvature threshold is 0.01 (1/m-).

20. The data processing system of claim 17, wherein the determining whether the road condition satisfies the predetermined road condition is based on whether at least one of a roll angle difference or a pitch angle difference between a first roll angle or a first pitch angle at a first time instant and a second roll angle or a second pitch angle at a second time instant is less than a predetermined threshold angle.

\* \* \* \* \*